(12) United States Patent
Nakata

(10) Patent No.: US 8,055,819 B2
(45) Date of Patent: Nov. 8, 2011

(54) INFORMATION PROCESSOR

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 162 days.

(21) Appl. No.: 12/601,496

(22) PCT Filed: May 29, 2008

(86) PCT No.: PCT/JP2008/059894
§ 371 (c)(1),
(2), (4) Date: Nov. 23, 2009

(87) PCT Pub. No.: WO2008/152918
PCT Pub. Date: Dec. 18, 2008

(65) Prior Publication Data
US 2010/0169520 A1    Jul. 1, 2010

(30) Foreign Application Priority Data

Jun. 13, 2007 (JP) ................................. 2007-155808

(51) Int. Cl.
*G06F 5/00* (2006.01)
*G06F 13/00* (2006.01)
(52) U.S. Cl. ............. 710/54; 710/33; 709/745; 709/696
(58) Field of Classification Search ................. 710/33, 710/54–57; 709/690, 696, 624, 715, 744–747; 365/189.05; 711/108
See application file for complete search history.

(56) References Cited

U.S. PATENT DOCUMENTS

| | | | | |
|---|---|---|---|---|
| 5,758,145 A | * | 5/1998 | Bhargava et al. | 707/744 |
| 5,978,792 A | * | 11/1999 | Bhargava et al. | 707/692 |
| 6,404,582 B1 | * | 6/2002 | Rodrigues de Miranda | 360/77.08 |
| RE39,458 E | * | 1/2007 | Pyne | 710/10 |
| 7,852,916 B2 | * | 12/2010 | Duvivier | 375/240 |
| 7,864,367 B2 | * | 1/2011 | Iizuka et al. | 358/1.9 |
| 2004/0049630 A1 | * | 3/2004 | Stark | 711/108 |
| 2004/0083227 A1 | * | 4/2004 | Yocom | 707/101 |
| 2007/0088959 A1 | * | 4/2007 | Cox et al. | 713/189 |
| 2009/0064045 A1 | * | 3/2009 | Tremblay | 715/835 |

FOREIGN PATENT DOCUMENTS

| | | |
|---|---|---|
| JP | 8-153077 A | 6/1996 |
| JP | 9-16440 A | 1/1997 |
| JP | 2843854 B | 10/1998 |
| WO | 2007111331 A | 10/2007 |

OTHER PUBLICATIONS

H. Iriguchi et al, "An Efficient Method for Storing and Retrieving Graph Structures", Transactions of the Institute of Electronics, Information and Communication Engineers, D-1, vol. J79-D-1. No. 8, pp. 502-510, Aug. 1996.
M. Terao et al., "Large-scale and High-performance Database on ACOS-4/XVP", NEC Technical Journal. Feb. 10, 1992, vol. 45, No. 1, pp. 67-75.

* cited by examiner

Primary Examiner — Christopher B Shin

(57) ABSTRACT

An information processor (program processing unit 1) for managing a data sequence in a fixed order comprises a direction array (reference data storage section 2) for storing a reference to each data item of the data sequence in an element of the index associated with the key to the data, and means (CPU 3) for changing all data keys referenced by elements within an arbitrary range of indexes in the direction array by the same amount, where memory contents within the range of the direction array are shifted by the number of indexes corresponding to the changed amount.

14 Claims, 12 Drawing Sheets

Fig.3

| DATA | INDICATION ARRAY INDEX | METADATA | METADATA TOTAL VALUE FROM FIRST DATA a |
|---|---|---|---|
| a | 0 | 100 | 100 |
| b | 0 | 250 | 350 |
| c | 0 | 200 | 550 |
| d | 1 | 300 | 850 |
| e | 1 | 160 | 1010 |
| f | 2 | 460 | 1470 |
| g | 3 | 200 | 1670 |
| h | 3=SL | 150 | 1820=TL |

Fig.5

| DATA | INDICATION ARRAY INDEX | METADATA | METADATA TOTAL VALUE FROM FIRST DATA a |
|---|---|---|---|
| a | 0 | 100 | 100 |
| b | 0 | 250 | 350 |
| c | 0 | 200 | 550 |
| d | 1 | 300 | 850 |
| e | 1 | 160 | 1010 |
| f | 2 | 460 | 1470 |
| g | 3 | 200 | 1670 |
| h | 3 | 150 | 1820 |
| i | 3=SL | 200 | 2020=TL |

INFORMATION PROCESSOR

TECHNICAL FIELD

The present invention relates to an information processor and an ordered data management method for use therein, and an associated program, and more particularly, to an ordered data management method for use in an information processor such as an information device, a communication device and the like. In this application, data which is input/output in a fixed order is defined as "ordered data."

BACKGROUND ART

A temporary data saving area reserved in an information device or a communication device for queuing data therein is generally configured to fetch or add data from or to the first or last element, as found in data structures such as FIFO (First-In First-Out) or FILO (First-In Last-Out).

On the other hand, in a packet scheduling mechanism implemented in a communication device having a multiplexing function with the intention to accomplish both suppressed delays and optimized load distribution, data is input/output in an ordered relationship other than FIFO and FILO. Here, a manipulation is required to fetch, from a temporary data saving area, data shifted from the head of a queue by an offset amount of data size which is determined based on the congestion condition of each path. This technique has been proposed by the present applicant (Patent Document 1). A queue in Patent Document 1 must be implemented such that data can be fetched or added from or to any element even other than the first and last ones. Further, a scheme is desired for enabling a high-speed data access using an offset amount of data size from the head as a key. The realization of such a scheme requires data management which allows the key to take an arbitrary possible value as an offset, and enables high-speed data access even if the relationship between the key and data dynamically varies in association with deletion or addition of data.

A known scheme for managing ordered data in which any arbitrary element can be accessible involves a data structure which is configured in the form of a list or array. Out of these structures, in the array structure, a value which can be taken as a key is limited within a range in which identification numbers (indexes) are defined for array elements. Since this range is determined at a stage where a memory is reserved for the array structure, the range of the key is limited by the size of the array structure itself. On the other hand, in the list structure, the value of a key is not limited to the size of a list itself. However, in the list structure, when access is made to data corresponding to an arbitrary key, the key must be searched for on the list. An expected value for this search time is proportional to the number of elements, for example, in a linear search, and proportional to a logarithm of the number of elements in base 2 in a faster two-branch search. This gives rise to a problem in which a larger number of elements results in a longer time required for accessing, as compared with the array structure.

Existing techniques for searching for a corresponding element from a key at high speeds include a hash method, a triple array method (Non-Patent Document 1), and the like. However, these techniques cannot be readily applied, if they employ a key which exhibits dynamical changes due to deletion and insertion of an element, such as a total value or the like of metadata representative of an attribute of a data body (the size of the data body, the number of dropped bits, and the like) from the first data thereof, because of the difficulties in following corresponding changes in data and key, as described, for example, in Patent Document 1.

Also, for correctly maintaining the relationship between a dynamically changing key and elements at all times in a list structure, manipulations such as deletion, insertion, and the like of data must be followed by again setting keys for all elements which have to be updated due to these manipulations. For example, when a key is chosen to be a total value of metadata from the first element, deletion of certain data results in a change in the total value of metadata of all elements subsequent to that data, so that keys must be set again for all elements from the deleted element to the last element. When a larger number of elements must be set again, a longer time is needed to perform processing for again setting the keys.

As described above, the array structure and hash method, which provide fast accesses, are not suited to the management of ordered data which can take a key of an arbitrary value, where a key value for data intended for a manipulation or other data dynamically changes in the event of manipulations such as deletion and change of certain data, addition of new data, and the like. The list structure, on the other hand, has a problem in that excessive time is needed to access and manipulate data.

Patent Document 1: International Publication No. 2007/111331 Pamphlet

Non-Patent Document 1: Iriguchi, Tsuda, Shishibori, Aoe, "Efficient Storage Search Method for Graph Structure," Transactions of the Institute of Electronics, Information and Communication Engineers D-1, Vol. J79-D-1, No. 8, pp. 502-510 (1996).

DISCLOSURE OF THE INVENTION

It is therefore an object of the present invention to provide an information processor which solves the problems mentioned above and which is capable of referencing an element associated with a key, which is a total value of metadata, at high speeds, and an ordered data management method for use therein, as well as an associated program.

An information processor of the present invention is for managing a data sequence in a fixed order. The information processor comprises:

an indication array for storing a reference to each data of the data sequence in an element of an index associated with a key to the data, and means, operative when keys of all data referenced by elements within an arbitrary index range of said indication array are changed by the same amount, for shifting memory contents within the range of said indication array by the number of indexes corresponding to the amount of the change.

An ordered data management method of the present invention is for use in an information processor for managing a data sequence in a fixed order, wherein:

the information processor is provided with an indication array for storing a reference to each data of the data sequence in an element of an index associated with a key to the data, and when the information processor changes keys of all data referenced by elements within an arbitrary index range of said indication array by the same amount, a process is executed for shifting memory contents within the range of said indication array by the number of indexes corresponding to the amount of the change.

A program of the present invention is for causing a processor to carry out processing within an information processor for managing a data sequence in a fixed order. The program is characterized by causing said information processor to execute processing for:

providing the information processor with an indication array for storing a reference to each data of the data sequence in an element of an index associated with a key to the data; and when changing keys of all data referenced by elements within an arbitrary index range of said indication array by the same amount, shifting memory contents within the range of said indication array by the number of indexes corresponding to the amount of the change.

With the configuration and operations as described above, the present invention can advantageously reference an element with a key which is a total value of metadata at high speeds.

BRIEF DESCRIPTION OF THE DRAWINGS

FIG. 3 A diagram showing examples of metadata corresponding to each data value and a total value thereof in the example of FIG. 2.

FIG. 5 A diagram showing examples of metadata corresponding to each data value and a total value thereof in the example of FIG. 4.

BEST MODE FOR CARRYING OUT THE INVENTION

Next, embodiments of the present invention will be described with reference to the drawings.

Embodiment 1

Figure 1:
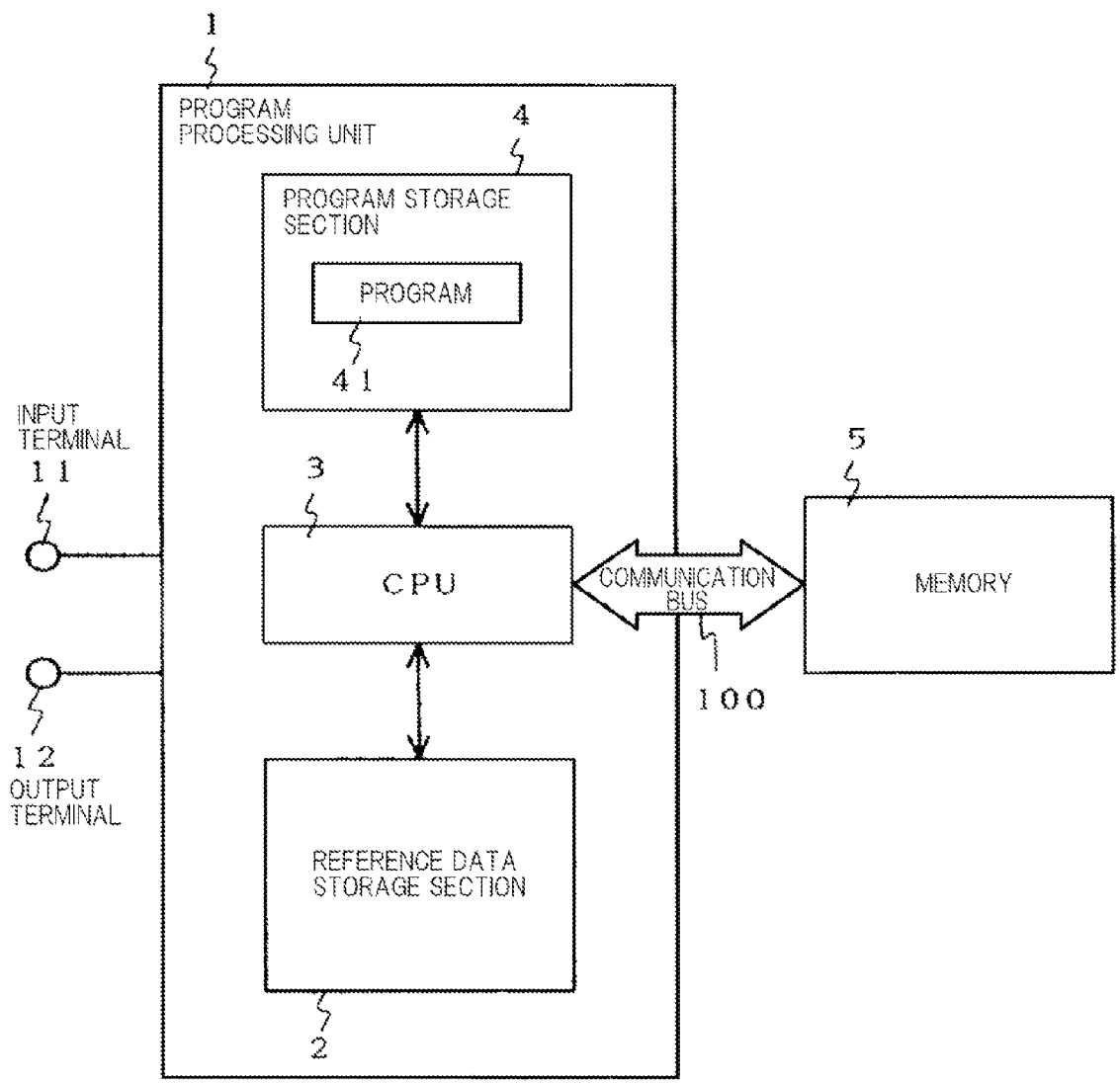
FIG. 1 A block diagram showing an exemplary configuration of a program processing section in an information processor according to a first embodiment of the present invention.

FIG. 1 is a block diagram showing an exemplary configuration of a program processing section in an information processor according to a first embodiment of the present invention.

In FIG. 1, program processing unit 1 comprises reference data storage section 2, CPU (Central Processing Unit) 3, program storage section 4, input terminal 11, and output terminal 12, and is connected to memory 5 through communication bus 100. Program storage section 4 stores program 41.

Figure 2:
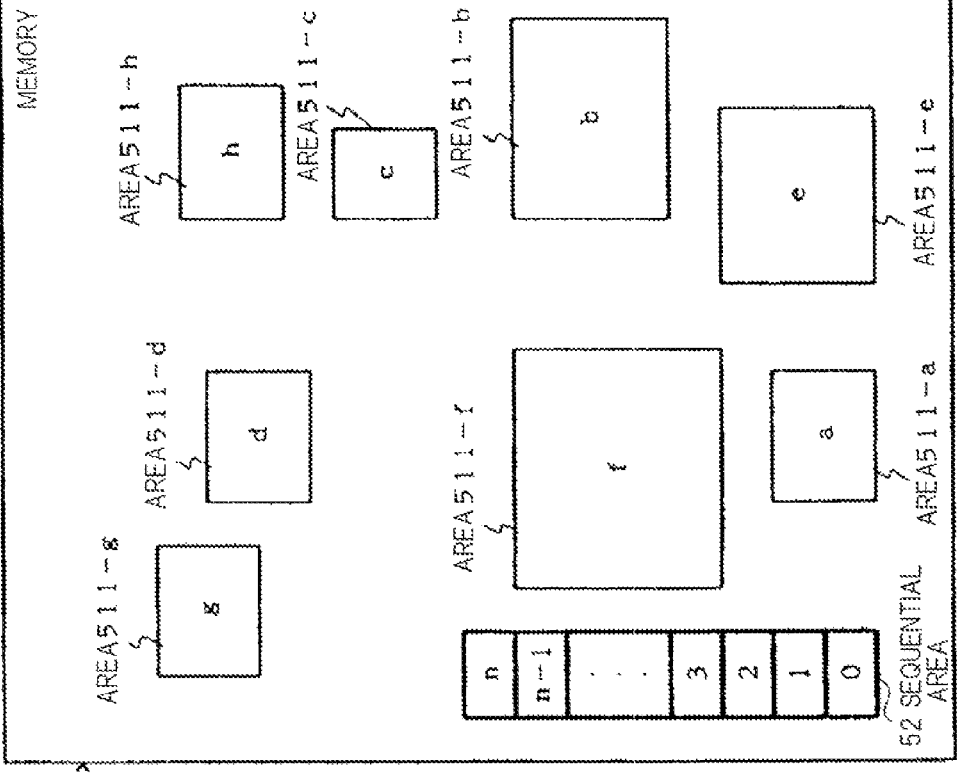
FIG. 2 A diagram showing an exemplary state of a reference data storage section and a memory in FIG. 1.
Figure 2:
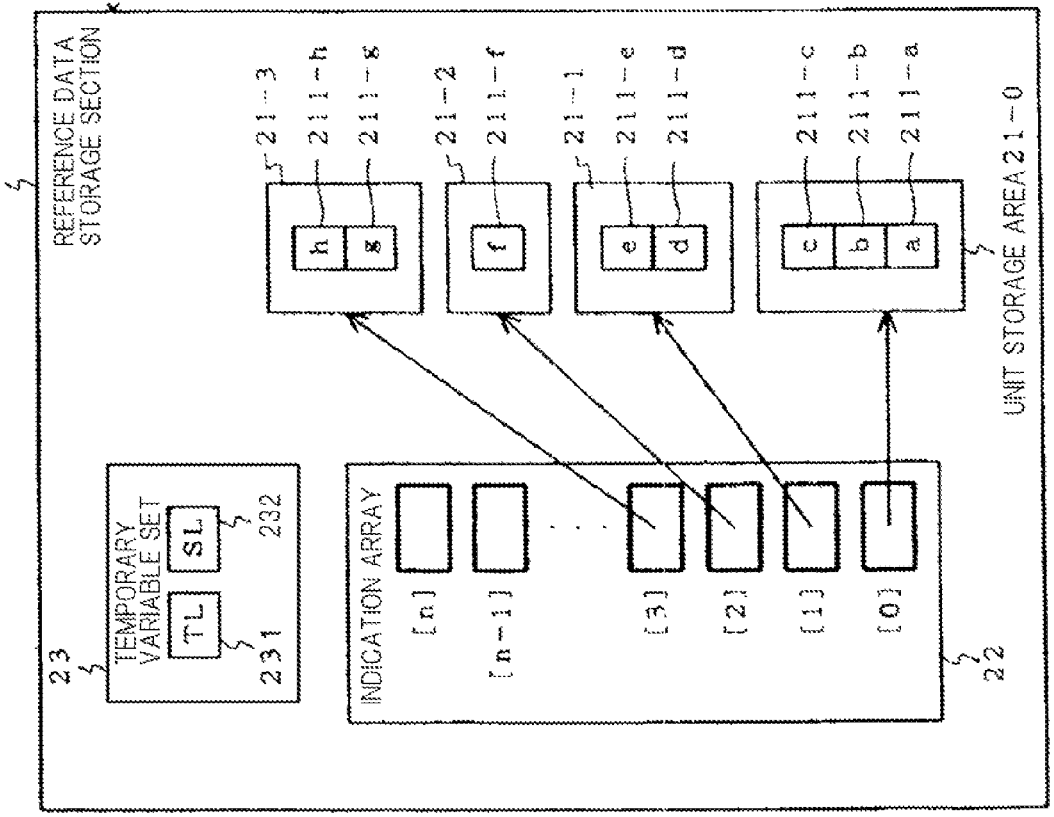

FIG. 2 is a diagram showing an exemplary state of reference data storage section 2 and memory 5 in FIG. 1.

In FIG. 2, reference data storage section 2 includes a plurality of unit storage areas 21-0~21-3, indication array 22, and temporary variable set 23.

Unit storage areas 21-0~21-3 include ordered data 211-a~211-h as variables.

Temporary variable set 23 contains last metadata total value (TL) 231, and indication array index (SL) 232 indicative of a unit storage area to which the last data belongs, as variables other than ordered data 211-a~211-h and indication array 22.

Memory 5 has reserved thereon separate areas 511-a~511-h respectively corresponding to data 211-a~211-h, which are variables of program 41, and sequential area 52 corresponding to indication array 22, through communication bus 100, by the action of program 41.

Figure 4:
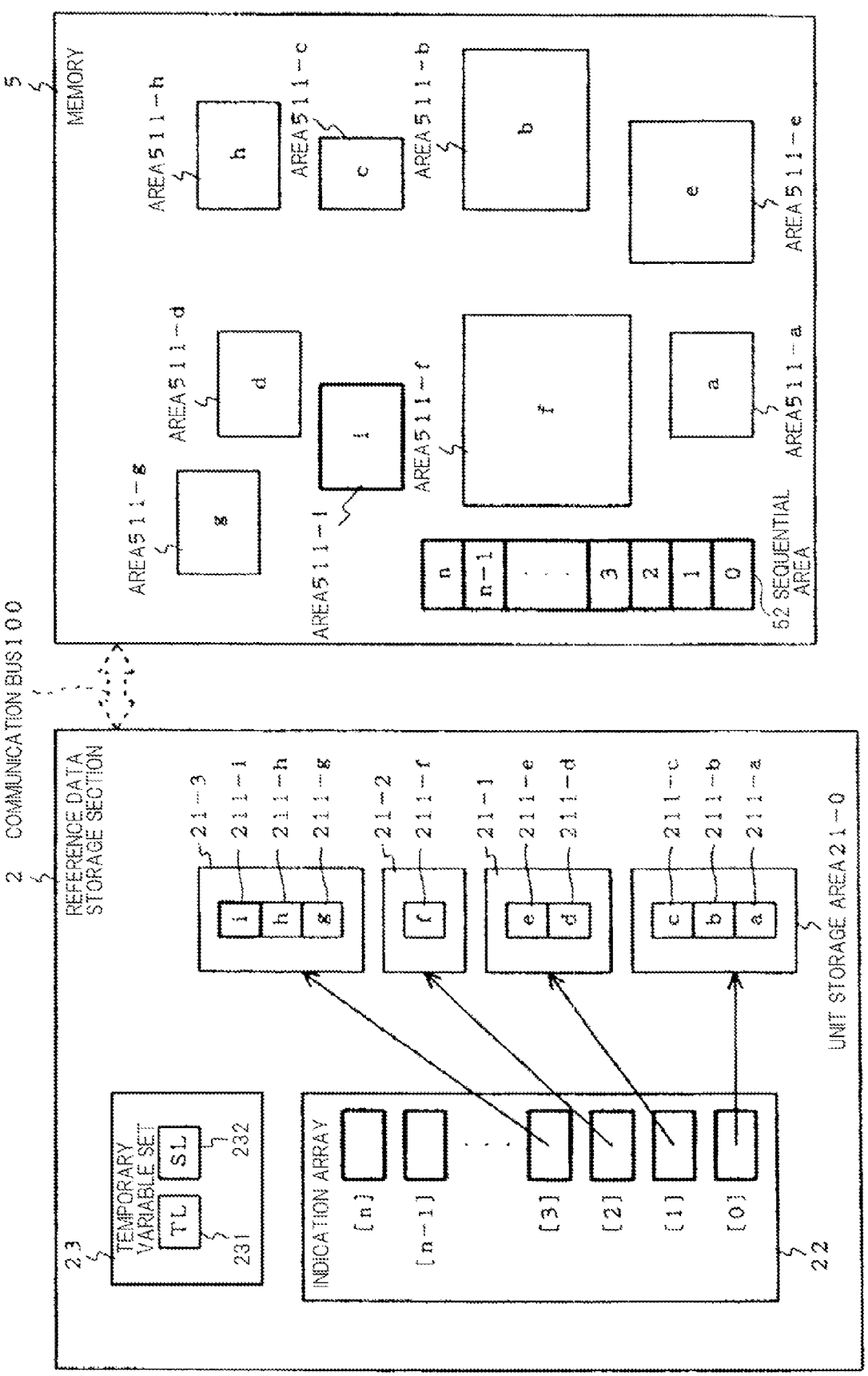
FIG. 4 A diagram showing an exemplary state of the reference data storage section and memory after data has been added thereto in FIG. 2.

FIG. 3 is a diagram showing examples of metadata corresponding to each data and a total value thereof in the example of FIG. 2. FIG. 4 is a diagram showing an exemplary state of reference data storage section 2 and memory 5 in FIG. 2 after data i has been added, and FIG. 5 is a diagram showing examples of metadata corresponding to each data and a total value thereof in the example of FIG. 4.

Figure 6:
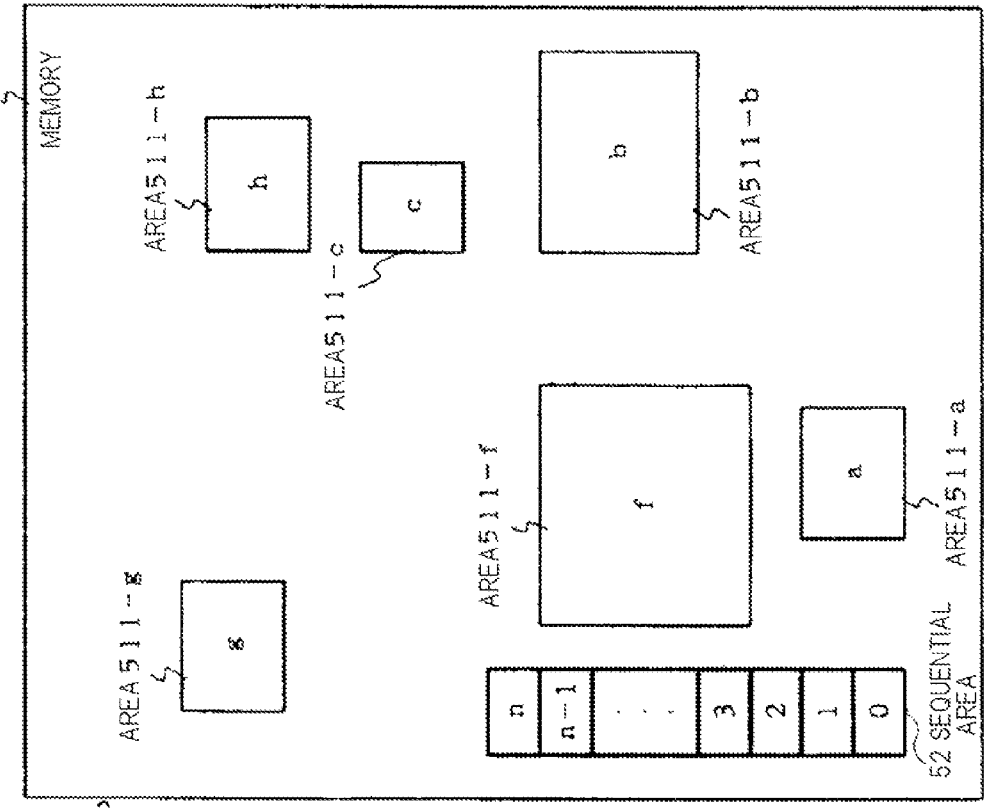
FIG. 6 A diagram showing an exemplary state of the reference data storage section and memory after data has been deleted therefrom in FIG. 2.
Figure 6:
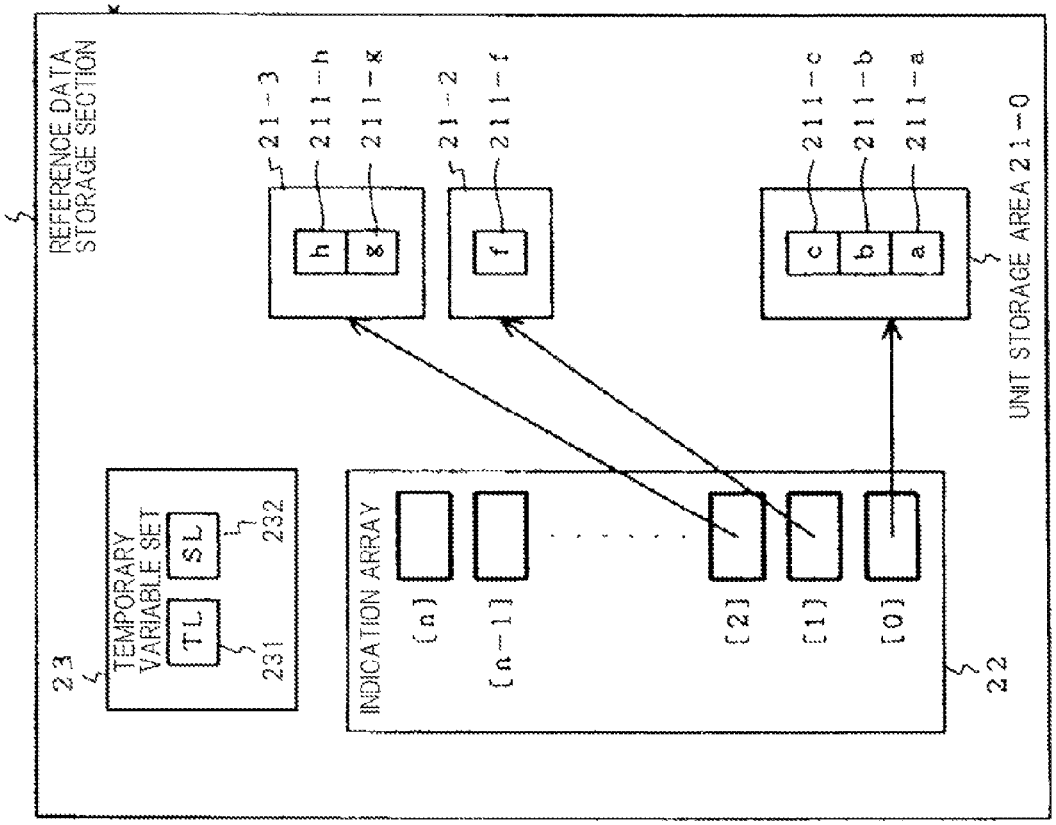
Figure 7:
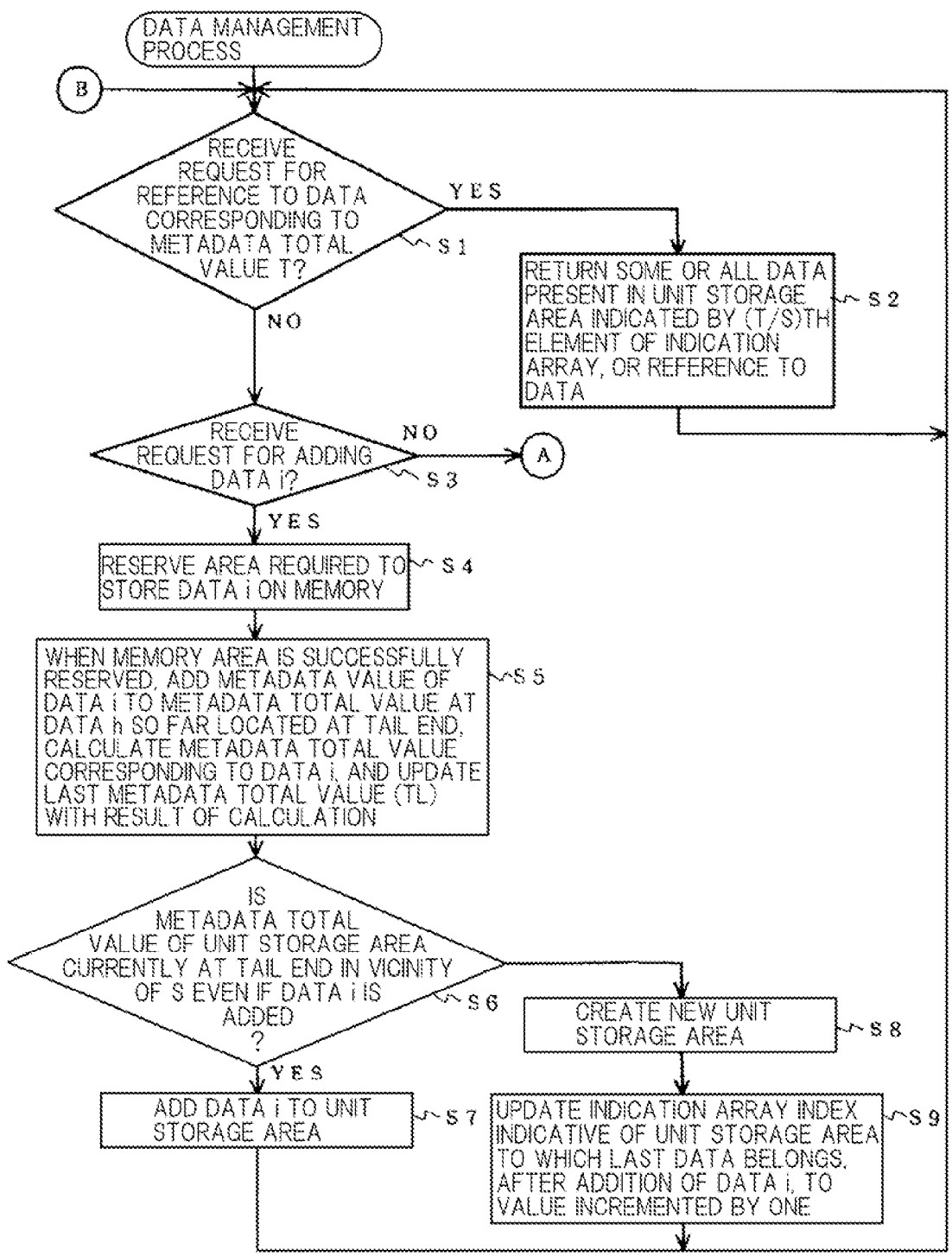
FIG. 7 A flow chart showing exemplary operations for managing ordered data by the program processing section of FIG. 1.
Figure 8:
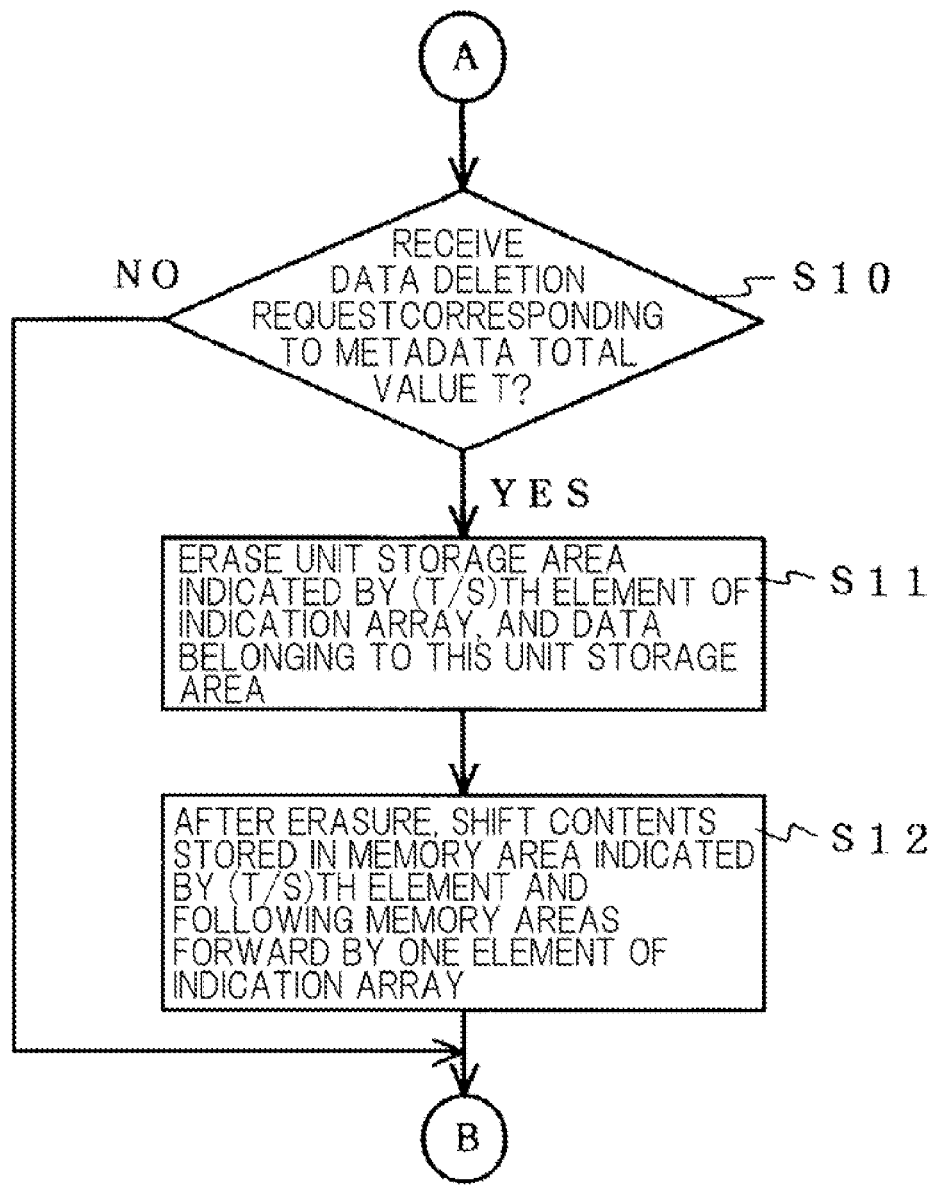
FIG. 8 A flow chart showing exemplary operations for managing ordered data by the program processing section of FIG. 1.

FIG. 6 is a diagram showing an exemplary state of reference data storage section 2 and memory 5 after data has been deleted in FIG. 2, and FIGS. 7 and 8 are flow charts showing exemplary operations for managing ordered data by program processing unit 1 in FIG. 1.

Referring to these FIGS. 1~8, a description will be given of operations for managing ordered data by the program processing unit of the information processor according to the first embodiment of the present invention.

In this regard, the processes shown in FIGS. 7 and 8 are implemented by program 41 executed by CPU 3.

The first embodiment of the present invention shows an example where high-speed data reference and data manipulation are enabled using a key which is chosen to be a total value of metadata associated with each data from the first data to pertinent data.

Individual data 211-a~211-h are accompanied with metadata representative of their attribute, and are distributed in unit storage areas 21-0~21-3 such that the total of their metadata is situated in the vicinity of set value S within each unit storage area.

Also, temporary variable set 23 includes index (TL) 231 for indication array 22 corresponding to unit storage area 21-3 at the tail end, and metadata total value (SL) 232 from the first data to the last data as variables.

First, a description will be given of operations in data reference in the first embodiment of the present invention.

Upon receipt of a request for referencing data corresponding to metadata total value T from input terminal 11 (step S1 in FIG. 7), program processing unit 1 responds back to a requesting party with some or all of data which are present in a unit storage area indicated by a (T/S)th element of indication array 22, or a reference to the data from output terminal 12 (step S2 in FIG. 7). Here, the "reference" refers to data provided for accessing other data, and includes, for example, a memory address value, a pointer and the like.

FIG. 3 shows examples of metadata corresponding to each data value and a total value thereof in the exemplary state of reference data storage section 2 and memory 5 shown in FIG. 2. Assume herein that set value S is equal to 500. That is to say, each time the total value of metadata is in the vicinity of a multiple of 500, data belongs to a different unit storage area, and a corresponding index of indication array 22 is incremented by one in FIG. 3.

For example, when a reference is requested for total value T of metadata equal to 900, T/S will take the following value.

$$T/S = 500/900 = 1.8$$

In this event, since the index of indication array 22 is an integer, the value of T/S is rounded down to reference the "first" element or rounded up or rounded off to the nearest integer to reference the "second" element. A mechanism for determining which should be employed can be implemented in different manners depending on applications of the present invention and the like.

In this embodiment, the value of T/S is rounded up, so that any or all of data d, e included in unit storage area 211-1 in FIG. 2 is returned as a reference result, as indicated by the [second] element (index is [1]) of the indication array.

Next, a description will be given of operations when new data is added to the end of the data structure in the first embodiment of the present invention.

Upon receipt of a request for adding data i from input terminal 11 (step S3 in FIG. 7), program processing unit 1 adds data i to unit storage area 21-3 (step S7 in FIG. 7) when the current metadata total value at the tail end of unit storage area 21-3 remains within the vicinity of set value S even if data i is added (step S6 in FIG. 7).

Program processing unit 1 adds data i, and creates a new unit storage area (step S8 in FIG. 7) if the metadata total value of unit storage area 21-3 currently located at the tail end is not in the vicinity of set value S (step S6 in FIG. 7). A mechanism for determining whether or not a new unit storage area should be created can be implemented in different manners depending on applications of the present invention.

Assume herein that data i has a metadata value of 200, and a new unit storage area is not created. FIG. 4 shows an exemplary state of reference data storage section 2 and memory 5 after the addition of data i in this event, and FIG. 5 shows a table representative of the relationship between the data and metadata.

However, prior to the foregoing works, program processing unit 1 must reserve an area required to store data i on memory 5 as required (step S4 in FIG. 7). Also, when an area is successfully reserved on memory 5, program processing unit 1 adds a metadata value of data i to the metadata total value at data h, which has been so far situated at the tail end, calculates a metadata total value corresponding to data i, and updates last metadata total value (TL) 231 with the result of the calculation (S5 in FIG. 7).

Also, when a new unit storage area is added, program processing unit 1 updates indication array index (SL) 232 indicative of a unit storage area to which the last data, after the addition of data i, belongs to a value incremented by one (step S9 in FIG. 7). In the example shown in FIGS. 4 and 5, calculated last metadata total value (TL) 231 is updated to the following value:

$$1820 + 200 = 2020$$

Indication array index (SL) 232 remains unchanged from before the insertion of data i, i.e., "3."

Next, a description will be given of operations when data is deleted in the first embodiment of the present invention.

Upon receipt of a data deletion request corresponding to metadata total value T from input terminal 11 (step S10 in FIG. 8), program processing unit 1 erases a unit storage area indicated by a (T/S)th element of indication array 22, and data which belongs to this unit storage area (step S11 in FIG. 8).

After erasing the unit storage area and data belonging to this unit storage area, program processing unit 1 shifts contents stored in the memory area indicated by the (T/S)th element of indication array 22 and the following memory areas, forward by one element of indication array 22 (step S12 in FIG. 8).

FIG. 6 shows a state where, assuming T=900, T/S=1.8 is rounded up to 2, so that program processing unit 1 has erased unit storage area 21-1 indicated by the "second" indication array element (the index is "1"), and data d, e included therein. After erasing unit storage area 21-1 and data d, e included therein, program processing unit 1 shifts contents of the memory with indexes equal to or more than "2" in indication array 22 shown in FIG. 2, forward by one element.

As a result, a reference to unit storage area 21-2 contained in an element of index "2" before the erasure (the state shown in FIG. 2) moves to an element of index "1" after the erasure of unit storage area 21-1 and data d, e included therein. Also, a reference to unit storage area 21-3 contained in an element of index "3" before the erasure moves to the element of index "2" after the erasure of unit storage area 21-1 and data d, e included therein.

In this way, references to unit storage areas contained in all indexes up to n move to elements, the indexes of which decrement by "one." Therefore, when a reference request with T=900 is received afterward, for example, data f will be returned. Since the capacity of data belonging to each unit storage area 21-0~21-3 is quantized in set value S, an update equivalent to a subtraction of a corresponding metadata total value is automatically made by a simple shift of index "1" in indication array 22.

Thus, in this embodiment, since the index of indication array 22 is a function of the metadata total value, a reference to an element using the metadata total value as a key can be performed at high speeds because no search is required for an index corresponding to the metadata total value.

Also, in this embodiment, no processing is required for subtracting the metadata total value by metadata of an erased element on an element-by-element basis, but the metadata total value is updated only with a single memory shift process, so that the metadata total value of each data item can be updated at high speeds after the erasure of the element.

Embodiment 2

Figure 9:
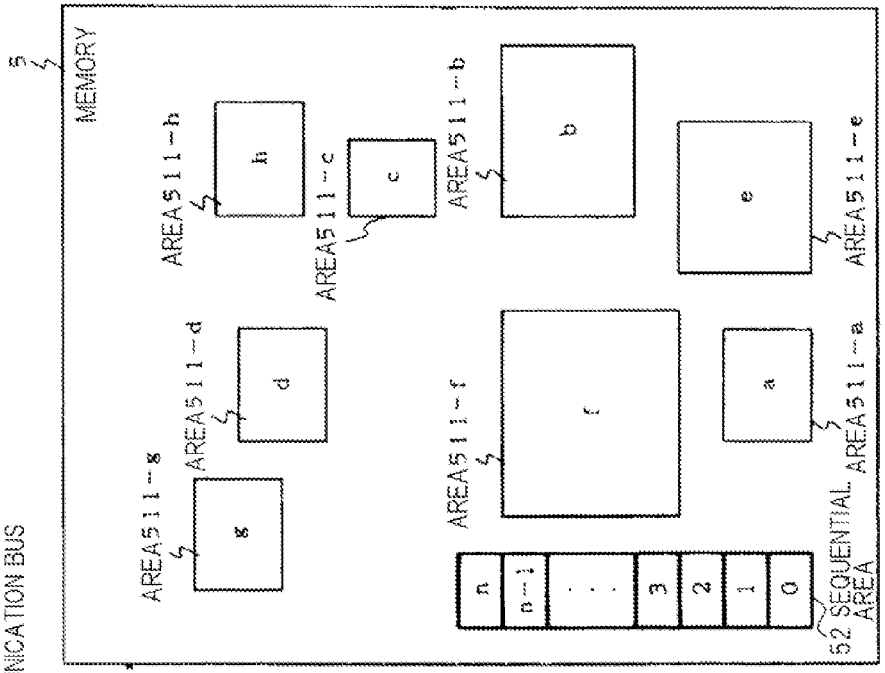
FIG. 9 A diagram showing an exemplary state of a reference data storage section and a memory in a second embodiment of the present invention.
Figure 9:
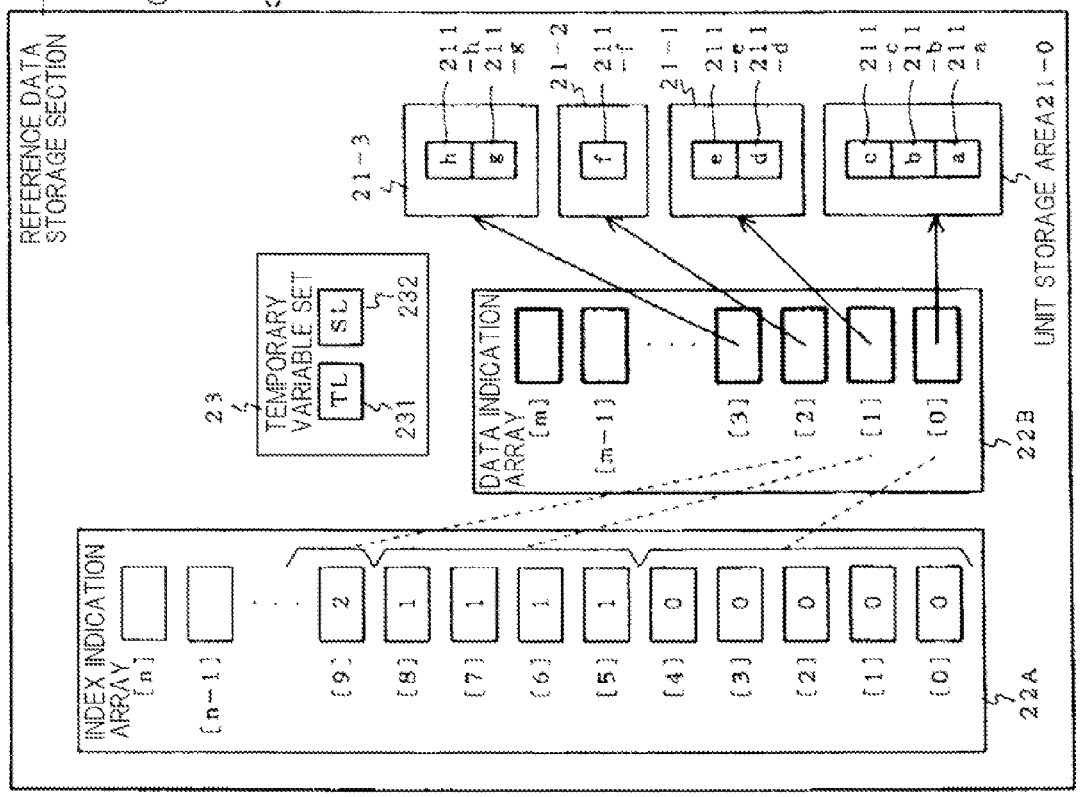

FIG. 9 is a diagram showing an exemplary state of a reference data storage section and a memory according to a second embodiment of the present invention.

A program processing unit of an information processor according to the second embodiment of the present invention is similar in configuration to the program processing unit of the information processor according to the first embodiment of the present invention, but they differ as regards the state of the reference data storage section and memory.

Specifically, in the first embodiment of the present invention described above, the metadata total value is updated in units of set value S after deletion of data. However, since the unit storage areas cannot always configured for every integer multiple of set value S, there is an error between the amount of actually removed data and set value S. As a result, an error also occurs between T, which is input upon reference to data, and an actual metadata total value corresponding to returned data. The second embodiment of the present invention shows an example where this error is limited to a certain value or less.

Referring to FIG. 9, this embodiment differs from the first embodiment of the present invention described above in that indication array 22 is divided into index indication array 22A and data indication array 22B.

Each element of data indication array 22B stores a reference to unit storage area 21-0~21-3 in a manner similar to indication array 22 in the first embodiment of the present invention. On the other hand, each element of index indication array 22A stores an index of data indication array 22B which should be referenced. The metadata total value of elements within unit storage areas 21-0~21-3 are quantized in the vicinity of an integer multiple of set value S, and the ratio of an actual metadata total value to an integer multiple of set value S is equal to or less than another error set value R.

Figure 10:
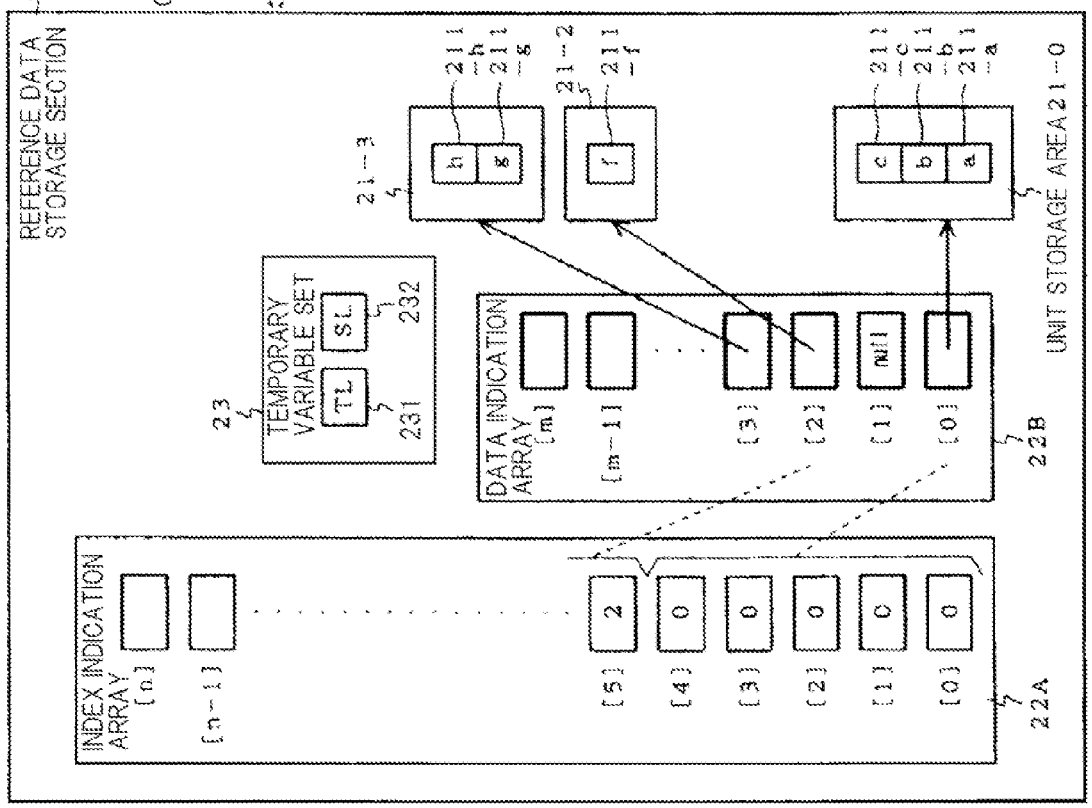
FIG. 10 A diagram showing an exemplary state of the reference data storage section and memory after data has been deleted therefrom in FIG. 9.
Figure 11:
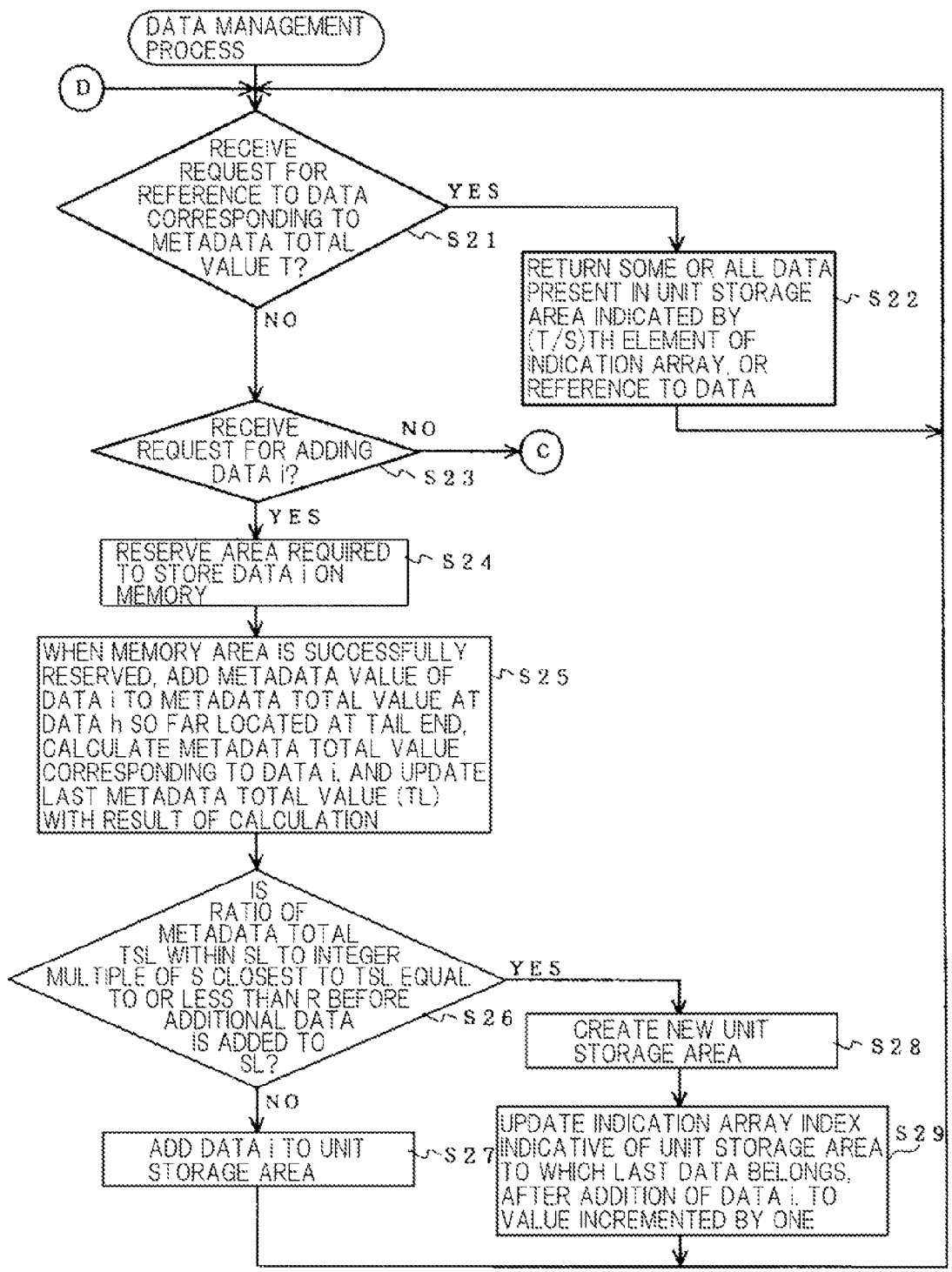
FIG. 11 A flow chart showing exemplary operations for managing ordered data by a program processing section according to the second embodiment of the present invention.
Figure 12:
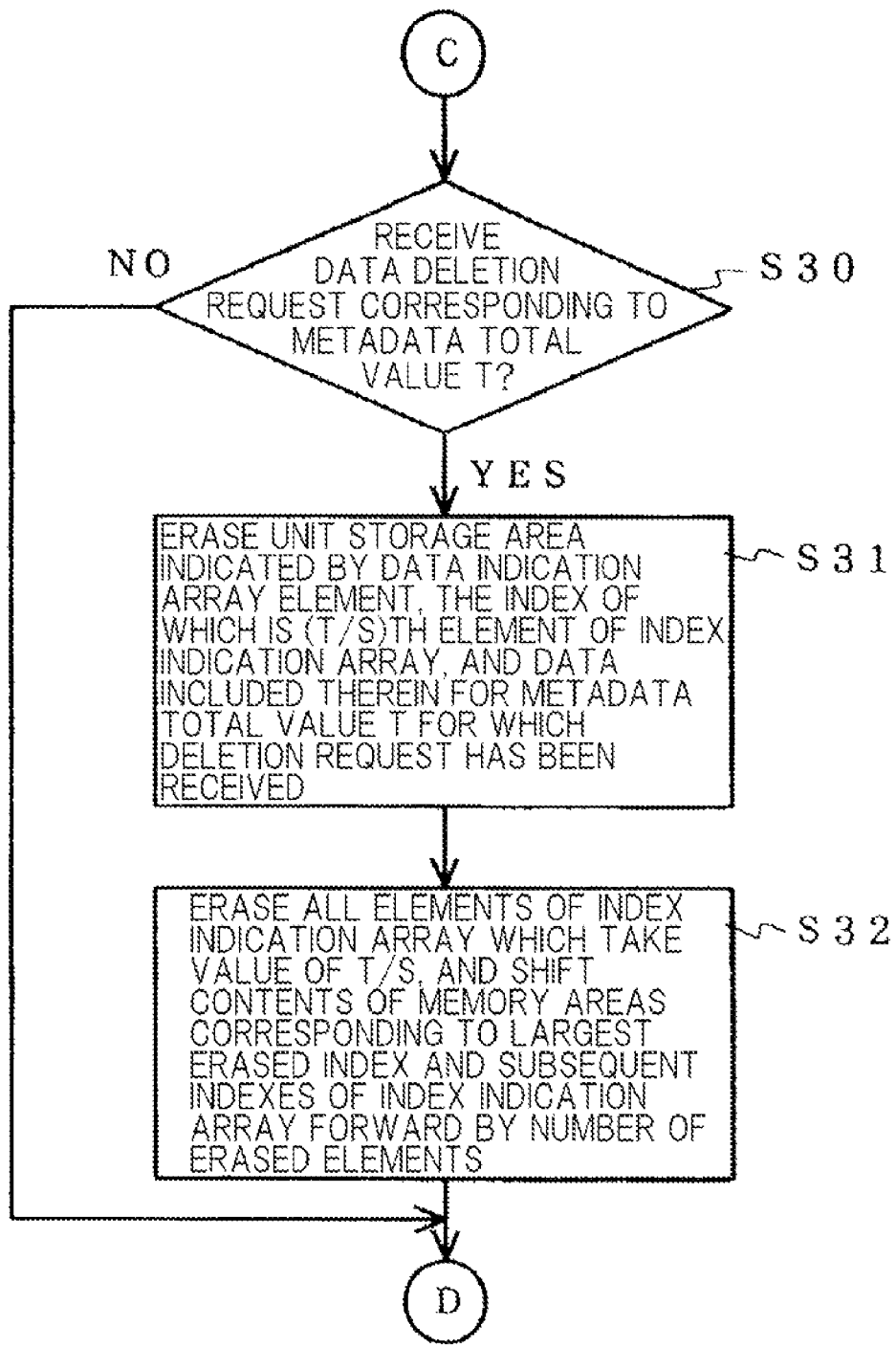
FIG. 12 A flow chart showing exemplary operations for managing ordered data by a program processing section according to the second embodiment of the present invention.

FIG. 10 is a diagram showing an exemplary state of reference data storage section 2 and memory 5 after deletion of data in FIG. 9, and FIGS. 11 and 12 are flow charts showing exemplary operations for managing ordered data by program processing unit 1 according to the second embodiment of the present invention.

Referring to these FIGS. 9~12, a description will be given of operations for managing ordered data by the program processing unit of the information processor according to the second embodiment of the present invention.

In this regard, the processes shown in FIGS. 11 and 12 are implemented by program 41 executed by CPU 3. Also, processing at steps S21~S25 and S27~S29 in FIG. 11 and processing at step S30 in FIG. 12 are similar to the processing at steps S1~S5 and S7~S9 in FIG. 7 and the processing at step 10 in FIG. 8 described above, so that descriptions thereon are omitted.

In this embodiment, in a determination as to whether or not a new unit storage area should be produced when data is added, when the ratio of metadata total value TSL within indication array index (SL) 232 to an integer multiple of set value S closest to metadata total value TSL is equal to or less than error set value R, before the additional data is added to indication array index (SL) 232 (step S26 in FIG. 11), a new unit storage area should be produced (step S28 in FIG. 11). This condition is met at all times when metadata total value TSL is equal to or more than S/R.

On the other hand, when data is deleted, program processing unit 1 erases a unit storage area indicated by an element of data indication array 22B, the index of which is a (T/S)th element of index indication array 22A, for metadata total value T for which program processing unit 1 has received a deletion request, and data included therein (step S31 in FIG. 12).

Program processing unit 1 also erases all elements of index indication array 22A which take the value of T/S, and shifts the contents of memory areas corresponding to the largest erased index and subsequent indexes of index indication array 22A forward by the number of erased elements (step S32 in FIG. 12).

FIG. 10 shows a state where a deletion request with T=900 has been accommodated with S=125, R=0.25, from the state shown in FIG. 3 where data is stored. In FIG. 10, T/S is rounded up to "8" so that program processing unit 1 erases unit storage area 21-1 indicated by an element of data indication array 22B, the index of which is the "eighth" element "1" of index indication array 22A, and data d, e included therein.

Program processing unit 1 also erases elements with indexes "5" through "8" of index indication array 22A, which take the value "1." Further, portions of index indication array 22A previously corresponding to indexes "9" onward, before the erasure of the memory area, have shifted forward by the four erased elements.

As a result, the element of index "1" of data indication array 22B, which ends up with "null" reference, can be used as a variable for storing a reference when a new unit storage area is produced in the future. In this regard, when the ratio of metadata total value TSL of last element SL to an integer multiple of set value S closest to metadata total value TSL is larger than error set value R, program processing unit 1 is configured not to accept a deletion request unless element SL is an only non-null element in data indication array 22B.

In this way, in this embodiment, upon receipt of a reference request for data corresponding to metadata total value T, program processing unit 1 returns data included in a unit storage area indicated by an element of data indication array 22B, the index of which is the (T/S)th element of index indication array 22A.

In this embodiment, when a unit storage area is added or deleted, the ratio of the metadata total value included in the unit storage area to T/S which serves as an index of the data indication array is kept equal to or less than error set value R, so that even for a reference request after these manipulations have been repeated, an error with a metadata total value of returned data is kept equal to or less than error set value R.

Specifically, the information processor according to the present invention such as an information device, a communication device and the like comprises one or more reference matrixes (indication arrays 22) which are matrixes of references to data, other than a data body, and associates an index of each reference matrix with a data search key. Then, when keys of all data referenced by elements within an arbitrary index range of the reference matrix are changed by the same amount, the contents of the memory within the range of the indication array are shifted by the number of indexes corresponding to the changed amount.

The information processor of the present invention provides a reference matrix which is a matrix of references to data being managed, other than ordered data itself which are managed. Also, in the present invention, a correspondence of an index in the reference matrix to a key of stored data has been defined. For example, the index is defined to be equal to the key value.

The information processor of the present invention stores a reference to each data item being managed in an element of an index corresponding to a key of the data in the reference matrix. An access to data corresponding to an arbitrary key is made by way of a reference stored in an element of an index corresponding to the key in the reference matrix.

The information processor of the present invention enables high-speed access to data corresponding to an arbitrary key because no search is required for an element corresponding to the key. Due to deletion of a certain element, change in key value, addition of a new element, exchange of data between elements, or the like, keys of all data referenced by an element within a certain index range of the reference matrix must be changed by the same amount in some cases. In this event, the information processor of the present invention shifts the contents of the memory within the range of the indication array by the number of indexes corresponding to a changed amount.

In this way, the information processor of the present invention carries out a change equivalent to a change in key value of each data item. This change is completed in a single process irrespective of the number of elements, and the reference matrix is not a data body but a matrix of references which is generally limited in size, so that a memory shift of a smaller capacity is simply required, as compared with a memory shift of the data body. Accordingly, the information processor of the present invention is capable of carrying out processing operations at higher speeds than an index change in an array structure related to the present invention.

While the present invention has been described with reference to the embodiments, the present invention is not limited to the embodiments described above. The present invention can be modified in configuration and details in various manners which can be understood by those skilled in the art to be within the scope of the present invention.

This application is the National Phase of PCT/JP2008/059894, filed May 29, 2008, which is based upon and claims the priority under Japanese Patent Application No. 2007-155808 filed Jun. 13, 2007, the disclosure of which is incorporated herein by reference in its entirety.

The invention claimed is:

1. An information processor for managing a data sequence in a fixed order, characterized by comprising:
an indication array for storing a reference to each data item of the data sequence in an element of an index associated with a key to the data; and
means, operative when keys of all data referenced by elements within an arbitrary index range of said indication array are changed by the same amount, for shifting memory contents within the range of said indication array by the number of indexes corresponding to the amount of the change.

2. The information processor according to claim 1, characterized in that the key of the data is the sum of metadata corresponding to each data item from the first data to that data or a function thereof.

3. The information processor according to claim 1, characterized in that the index of said indication array is associated in a relationship in which the range of the keys corresponds one-to-one to the indexes of said indication array.

4. The information processor according to claim 1, characterized in that the range of keys assigned to each index of said indication array is identical in width for any index.

5. The information processor according to claim 1, characterized by, upon deletion of certain data, shifting memory contents by a range of indexes of said indication array corresponding to the data from immediately before the range to the head or from immediately after the range to the tail end.

6. The information processor according to claim 1, characterized by, upon insertion of certain data, shifting memory contents from immediately before the insertion to the head or by shifting memory contents from immediately after the insertion to the last by the number of indexes required for the insertion of the data.

7. The information processor according to claim 1, characterized in that when a plurality of data correspond to a single index in a relationship between the data and the indexes, corresponding data are all collected before the data are added, or when certain data is deleted, data corresponding to the same index as the data are all erased.

8. An ordered data management method for use in an information processor for managing a data sequence in a fixed order, characterized by:
providing said information processor with an indication array for storing a reference to each data item of the data sequence in an element of an index associated with a key to the data; and
when said information processor changes keys of all data referenced by elements within an arbitrary index range of said indication array by the same amount, a process for shifting memory contents within the range of said indication array by the number of indexes corresponding to the amount of the change is executed.

9. The ordered data management method according to claim 8, characterized in that the key of the data is the sum of metadata corresponding to each data item from the first data to that data or a function thereof.

10. The ordered data management method according to claim 8, characterized in that the index of said indication array is associated in a relationship in which the range of the keys corresponds one-to-one to the indexes of said indication array.

11. The ordered data management method according to claim 8, characterized in that the range of keys assigned to each index of said indication array is identical in width for any index.

12. The ordered data management method according to claim 8, characterized by, upon deletion of certain data, shifting memory contents by a range of indexes of said indication array corresponding to the data from immediately before the range to the head or from immediately after the range to the last.

13. The ordered data management method according to claim 8, characterized by, upon insertion of certain data, shifting memory contents from immediately before the insertion to the head or by shifting memory contents from immediately after the insertion to the last by the number of indexes required for the insertion of the data.

14. The ordered data management method according to claim 8, characterized in that when a plurality of data correspond to a single index in a relationship between the data and the indexes, corresponding data are all collected before the data is added, or when certain data is deleted, all data corresponding to the same index as the data are erased.

* * * * *